(12) United States Patent
Soga et al.

(10) Patent No.: US 6,572,200 B2
(45) Date of Patent: Jun. 3, 2003

(54) VEHICLE BRAKE CONTROL SYSTEM AND METHOD

(75) Inventors: Masayuki Soga, Susono (JP); Yutaka Ohnuma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/000,299

(22) Filed: Dec. 4, 2001

(65) Prior Publication Data

US 2002/0113487 A1 Aug. 22, 2002

(30) Foreign Application Priority Data

Dec. 15, 2000 (JP) .......................... 2000-381463

(51) Int. Cl.[7] .............................. B60J 13/66; B60J 8/00
(52) U.S. Cl. ......................................... 303/3; 303/119.1
(58) Field of Search .......................... 303/3, 11, 15, 303/20, 113.1, 113.2, 113.4, 122.03, 122.04, 122.05, 122.06, 116.1, 119.1

(56) References Cited

U.S. PATENT DOCUMENTS

| 5,951,116 A | | 9/1999 | Nagasaka et al. | |
|---|---|---|---|---|
| 6,099,086 A | * | 8/2000 | Feigel et al. | 303/113.4 |
| 6,425,644 B2 | * | 7/2002 | Kawahata et al. | 303/122 |
| 2001/0006305 A1 | * | 7/2001 | Nakamura et al. | 303/11 |
| 2002/0153771 A1 | * | 10/2002 | Obuchi | 303/155 |
| 2002/0180262 A1 | * | 12/2002 | Hara et al. | 303/119.1 |
| 2002/0180267 A1 | * | 12/2002 | Hara et al. | 303/187 |

FOREIGN PATENT DOCUMENTS

| EP | 1 016 574 A | 7/2000 |
|---|---|---|
| JP | A 61-181761 | 8/1986 |
| JP | A 11-504296 | 4/1999 |

* cited by examiner

Primary Examiner—Christopher P. Schwartz
(74) Attorney, Agent, or Firm—Oliff & Berridge, PLC

(57) ABSTRACT

A brake control system and method that includes high-pressure fluid supply sources and cutoff devices for cutting off communication between a master cylinder and wheel cylinders during a control process. A determination is made whether there is inconsistency between detection values of two pressure detectors for detecting a pressure in the master cylinder and a detection value of a stroke detector for detecting a stepping-on stroke of a brake pedal. A final target deceleration of the vehicle is calculated based on the detection values that are consistent with each other and braking force of each wheel is controlled based on the final target deceleration.

28 Claims, 5 Drawing Sheets

VEHICLE BRAKE CONTROL SYSTEM AND METHOD

INCORPORATION BY REFERENCE

The disclosure of Japanese Patent Application No. 2000-381463 filed on Dec. 15, 2000 including the specification, drawings and abstract is incorporated herein by reference in its entirety.

BACKGROUND OF THE INVENTION

1. Field of the Invention

The invention generally relates to a brake control system of a vehicle such as an automobile. More particularly, the invention relates to a brake control system that controls a braking force to the vehicle based on an operational force applied to a braking member by a vehicle operator, and a displacement amount of the braking member applied by the vehicle operator.

2. Description of Related Art

There has been a well-known braking controller in which a braking control amount is set based on a depression force of a brake pedal applied by a vehicle operator and a stroke of the brake pedal resulting from being depressed by the vehicle operator. This technology is disclosed in JP-A-11-504296.

In the aforementioned braking controller, at least one of a plurality of depression force sensors for detecting the depression force applied to the brake pedal, and a plurality of stroke sensors for detecting a stroke of the brake pedal, are provided. Based on the resultant values detected by those sensors, the amount of the braking operation applied by the vehicle operator is estimated. Accordingly, this makes it possible to estimate the amount of the braking operation applied by the vehicle operator.

In a vehicle braking controller that has a cutoff device that cuts off a passage between a master cylinder and wheel cylinders corresponding to the respective wheels, and a high-pressure fluid supply source that supplies a high-pressure hydraulic fluid to the passage, high pressure hydraulic fluid is supplied to the master cylinder from the high-pressure fluid supply source to force back the brake pedal when an abnormality occurs in the cutoff device and the cutoff device is not placed in an open state sufficiently. As a result, the stroke of the brake pedal is reduced even if the respective sensors are in normal operating states.

When a combination of a single depression-force sensor and two stroke sensors is employed, the amount of the braking operation applied by the vehicle operator is estimated mainly on the basis of the detection values of the two stroke sensors which have precedent over the detection value of the single depression-force sensor. In the aforementioned case, the estimated amount of the braking operation may be smaller than the braking amount required by the operator. This problem may also occur when the amount of the braking operation applied by the operator is estimated on the basis of the detection values of two depression-force sensors and two stroke sensors.

SUMMARY OF THE INVENTION

It is an object of the invention to provide a brake control system and method that controls the braking force applied to each wheel in accordance with the braking operation of a vehicle operator by more optimally estimating a braking amount required by the operator.

The aforementioned brake control system and method includes a cutoff device that cuts off a passage between a master cylinder and a wheel cylinder provided for each wheel of the vehicle, a high-pressure fluid supply source that supplies a high-pressure operating fluid to the passage between the cutoff device and the wheel cylinder, at least two operation force detectors that detect a force applied by an operator of the vehicle so as to operate a braking member, at least one displacement detector that detects a displacement of the braking member operated by the operator of the vehicle, and a hydraulic pressure controller that controls a hydraulic pressure within the wheel cylinder on the basis of values detected by the at least two operation force detectors and the at least one displacement detector. In the braking controller according this invention, the number of the operation force detectors is larger than the number of the displacement detector(s). When there is inconsistency among the values detected by the at least two operation force detectors, and the at least one displacement detector, the hydraulic pressure within the wheel cylinder is controlled on the basis of less than all of the detected values.

In the aforementioned brake control system and method, the number of the operation force detectors is larger than the value of the displacement detector(s), and the hydraulic pressure controller controls the hydraulic pressure in the wheel cylinder on the basis of the detection values in which there is consistency. Therefore, the braking amount required by the vehicle operator may be estimated on the basis of the detection values in which there is consistency without using the detection values in which there is inconsistency. As a result, the braking force applied to each wheel may be more optimally controlled in accordance with the amount of braking required by the vehicle operator.

In the brake control system and method in accordance with an embodiment of this invention, the at least one operation force detector includes two operation force detectors and the at least one displacement detector includes one displacement detector. When there is consistency between values detected by the two operation force detectors, and there is inconsistency between the values detected by the two operation force detectors and a value detected by the one displacement detector, the hydraulic pressure controller controls the hydraulic pressure within the wheel cylinder on the basis of the values detected by the two operation force detectors.

When there is consistency between values detected by the two operation force detectors, and there is inconsistency between the values detected by the two operation force detectors and the value detected by the displacement detector, the hydraulic pressure in the wheel cylinder is controlled on the basis of the values detected by the two operation force detectors. Even if an abnormality occurs in the cutoff device which may cause the high-pressure hydraulic fluid to flow from the high-pressure fluid supply source to the master cylinder via the cutoff device, and the braking member like a brake pedal is forced back to reduce the displacement degree, the hydraulic pressure within the wheel cylinder is controlled on the basis of the values detected by the two operation force detectors. Accordingly, the detection values that do not accurately reflect the braking amount required by the vehicle operator can be ignored. As a result, the braking amount applied to each wheel can be controlled so as not to be lower than the braking amount required by the operator.

In the brake control system and method in accordance with an embodiment of this invention, the at least one operation force detector includes two operation force detectors and the at least one displacement detector includes one displacement detector. When there is inconsistency between values detected by the two operation force detectors, and there is consistency between one of the values detected by the two operation force detectors and a value detected by the one displacement detector, the hydraulic pressure controller controls the hydraulic pressure within the wheel cylinder on the basis of the one of the values detected by the two operation force detectors and the value detected by the one displacement detector.

When there is inconsistency between values of the two operation force detectors, and there is consistency between one of the values of the two operation force detectors and the value detected by the displacement detector, the hydraulic pressure within the wheel cylinder is controlled on the basis of the value detected by one of the operation force detectors and the value detected by the displacement detector. Accordingly, the braking amount required by the operator may be estimated on the basis of the values in which there is consistency without using those values in which there is inconsistency, thus controlling the braking force applied to the wheel optimally in accordance with the braking amount required by the operator.

In the brake control system and method in accordance with an embodiment of this invention, the hydraulic pressure controller determines whether each pair of the detected values has consistency by determining whether a relationship between the each pair of the detected values is within a predetermined normal zone.

In the brake control system and method in accordance with an embodiment of this invention, the operation force detector detects a pressure within the master cylinder.

In the brake control system and method in accordance with an embodiment of this invention, the displacement detector detects a stroke of the braking member.

In the brake control system and method in accordance with an embodiment of this invention, when there is consistency between the values detected by the two operation force detectors, and there is inconsistency between the values detected by the two operation force detectors and the value detected by the one displacement detector, the hydraulic pressure controller controls the hydraulic pressure within the wheel cylinder on the basis of an average value of the values detected by the two operation force detectors.

In the brake control system and method in accordance with an embodiment of this invention, when there is consistency among the values detected by the at least one operation force detector and the at least one displacement detector, the hydraulic pressure controller controls the hydraulic pressure within the wheel cylinder on the basis of an average value of the two detection values of the two operation force detectors, and the detection value of the displacement detector.

In the brake control system and method in accordance with an embodiment of this invention, the hydraulic pressure controller determines that there is consistency in a relationship between values detected by the two operation force detectors when the two detection values are substantially the same.

In the brake control system and method in accordance with an embodiment of this invention, the hydraulic pressure controller determines whether each pair of the detected values has consistency by determining whether a relationship between the each pair of the detected values is within a predetermined normal zone. When a relationship between the values detected by the two operation force detectors is within the normal zone, and relationships between the values detected by the two operation force detectors and the value detected by the one displacement detector are within the same abnormal zone that deviates from a predetermined normal zone with respect to the relationship between the values detected by the two operation force detectors and the one displacement detector, the hydraulic controller controls the hydraulic pressure within the wheel cylinder on the basis of the values detected by the two operation force detectors.

In the brake control system and method in accordance with an embodiment of this invention, the hydraulic pressure controller determines whether each pair of the detected values has consistency by determining whether a relationship between the each pair of the detected values is within a predetermined normal zone. When a relationship between the values detected by the two operation force detectors is within the normal zone, and relationships between the values detected by the two operation force detectors and the value detected by the one displacement detector are within different abnormal zones that deviate from a predetermined normal zone with respect to the relationship between the values detected by the two operation force detectors and the one displacement detector, the hydraulic controller places the cutoff device in an open state such that the hydraulic pressure within the wheel cylinder is directly controlled by the hydraulic pressure within the master cylinder.

In the brake control system and method in accordance with an embodiment of this invention, the hydraulic pressure controller determines whether each pair of the detected values has consistency by determining whether a relationship between the each pair of the detected values is within a predetermined normal zone. When a relationship between the values detected by the two operation force detectors is not within the normal zone, and relationships between the values detected by the two operation force detectors and the value detected by the one displacement detector are within different abnormal zones that deviate from the normal zone with respect to the relationship between the values detected by the two operation force detectors and the one displacement detector, the hydraulic controller places the cutoff device in an open state such that the hydraulic pressure within the wheel cylinder is directly controlled by the hydraulic pressure within the master cylinder.

DETAILED DESCRIPTION OF PREFERRED EMBODIMENTS

Hereinafter, the invention will be described in detail with respect to preferred embodiments referring to the accompanying drawings.

Figure 1A:
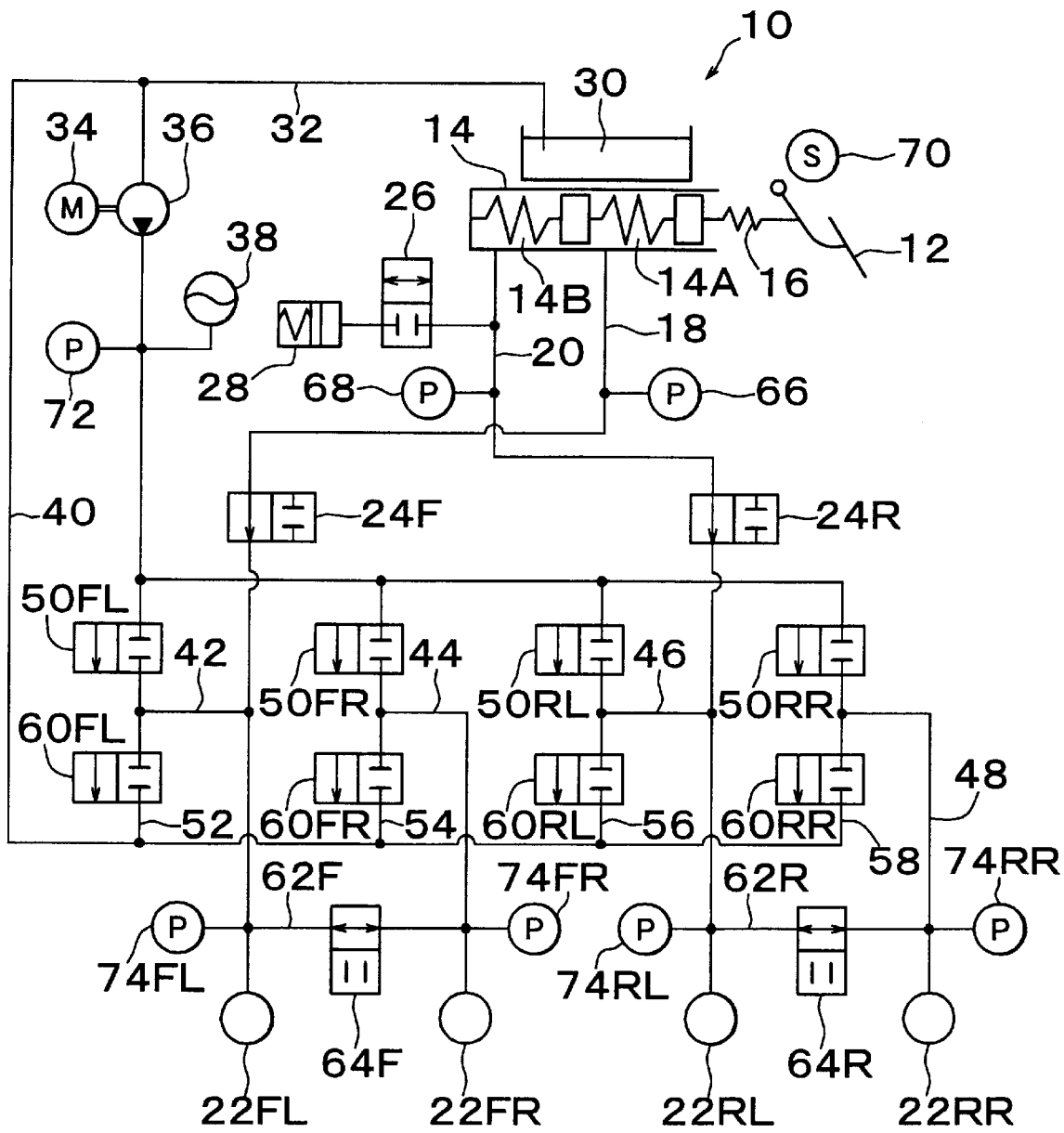
FIG. 1A is a schematic block diagram showing a hydraulic circuit of a brake control system according to one exemplary embodiment of this invention.
Figure 1B:
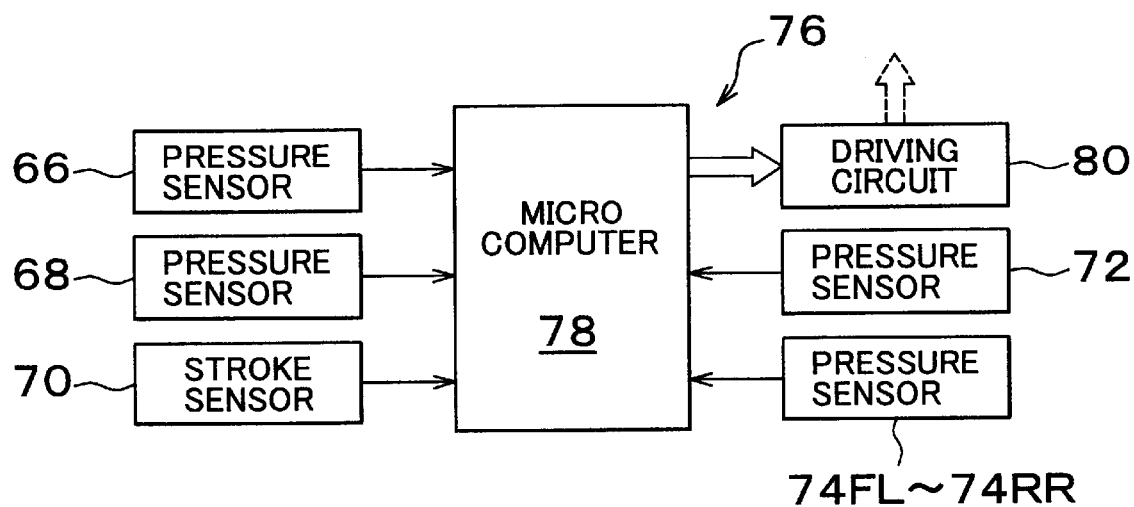
FIG. 1B is a schematic block diagram showing an electronic control unit (ECU) of a brake control system according to one exemplary embodiment of this invention.

FIGS. 1A and 1B show block diagrams representing a hydraulic circuit and an electronic control unit (ECU) in a vehicle brake control system according to an embodiment of the invention. In FIG. 1A, each solenoid of the respective electromagnetic switching valves is omitted for simplifying the drawing.

An electrically controlled hydraulic braking device 10 includes a master cylinder 14 that supplies a brake oil under pressure in response to depression of a brake pedal 12 operated by a vehicle operator. A dry stroke simulator 16 is disposed between the brake pedal 12 and the master cylinder 14.

The master cylinder 14 includes a first master cylinder chamber 14A and a second master cylinder chamber 14B. The ends of a brake oil pressure supply pipe 18 for front wheels and a brake oil pressure control pipe S20 for rear wheels are connected to the master cylinder chambers 14A and 14B, respectively. Wheel cylinders 22FL and 22RL for controlling the braking force applied to the front left wheel and the rear left wheel are connected to the other ends of the brake oil pressure control pipes 18 and 20, respectively.

Electromagnetic switching valves (master cut valves) 24F and 24R that are open during normal operation are provided in the brake oil pressure supply pipes 18 and 20, respectively. The electromagnetic switching valves 24F and 24R function as cutoff devices for controlling communication between the first master cylinder chamber 14A, the second master cylinder chamber 14B and the corresponding wheel cylinders. A wet stroke simulator 28 is connected to the brake oil pressure supply pipe 20 between the master cylinder 14 and the electronic switching valves 24F, 24R via an electromagnetic switching valve 26 that is closed during normal operation.

A reservoir 30 is connected to the master cylinder 14. The reservoir 30 is also connected to one end of a hydraulic pressure supply pipe 32. An oil pump 36 driven by an electric motor 34 is provided in the hydraulic pressure supply pipe 32. An accumulator 38 for accumulating a high hydraulic pressure is connected to the hydraulic pressure supply pipe 32 on a discharge side of the oil pump 36. One end of a hydraulic pressure discharge pipe 40 is connected to the hydraulic pressure supply pipe 32 between the reservoir 30 and the oil pump 36.

The hydraulic pressure supply pipe 32 on the discharge side of the oil pump 36 is connected to the brake oil pressure supply pipe 18 between the electromagnetic switching valve 24F and the wheel cylinder 22FL via a hydraulic pressure control pipe 42, and is connected to a wheel cylinder 22FR for the front right wheel by a hydraulic pressure control pipe 44. The hydraulic pressure supply pipe 32 on the discharge side of the oil pump 36 is also connected to the brake oil pressure supply pipe 20 between the electromagnetic switching valve 24R and the wheel cylinder 22RL via a hydraulic pressure control pipe 46, and is connected to a wheel cylinder 22RR for the rear right wheel by a hydraulic pressure control pipe 48.

Electromagnetic switching valves 50FL, 50FR, 50RL, 50RR are provided in the hydraulic pressure control pipes 42, 44, 46, 48, respectively, and are closed during normal operation. The hydraulic pressure control pipes 42, 44, 46, 48 on the side of the wheel cylinders 22FL, 22FR, 22RL, 22RR relative to the electromagnetic switching valves 50FL, 50FR, 50RL, 50RR are connected to the hydraulic pressure discharge pipe 40 via hydraulic pressure control pipes 52, 54, 56, 58 respectively. Electromagnetic switching valves 60FL, 60FR, 60RL, 60RR are provided in the hydraulic pressure control pipes 52, 54, 56, 58 respectively.

Each of the electromagnetic switching valves 50FL, 50FR, 50RL, 50RR functions as a compression control valve for each of the wheel cylinders 22FL, 22FR, 22RL, 22RR. Each of the electromagnetic switching valves 60FL, 60FR, 60RL, 60RR functions as a decompression control valve for each of the wheel cylinders 22FL, 22FR, 22RL, 22RR. Accordingly, those electromagnetic switching valves constitute compression/decompression control valves cooperating with each other so as to control supply and discharge of high-pressure oil in the accumulator 38 to and from the respective wheel cylinders.

The brake oil pressure supply pipe 18 for the front wheels is connected to the hydraulic pressure control pipe 44 for the front right wheel via a connection pipe 62F at a location near the corresponding wheel cylinders 22FL, 22FR. An electromagnetic switching valve 64F, which is open during normal operation, is provided in the connection pipe 62F and functions as a communication control valve for controlling communication between the wheel cylinders 22FL and 22FR.

Similarly, the brake oil pressure supply pipe 20 for the rear wheels is connected to the hydraulic pressure control pipe 48 for the rear right wheel via a connection pipe 62R at a location near the corresponding wheel cylinders 22RL, 22RR. An electromagnetic switching valve 64R provided in the connection pipe 62R functions as a communication control valve for controlling communication between the wheel cylinders 22RL and 22RR and is open during normal operations.

As shown in FIG. 1A, a first pressure sensor 66 that detects a pressure in the brake oil pressure control pipe 18 as a first master cylinder pressure Pm1 is provided in the brake oil pressure control pipe 18 between the first master cylinder chamber 14A and the electromagnetic switching valve 24F. Similarly, a second pressure sensor 68 that detects a pressure in the brake oil pressure control pipe 20 as a second master cylinder pressure Pm2 is provided in the brake oil pressure control pipe 20 between the second master cylinder chamber 14B and the electromagnetic switching valve 24R. The first and second master cylinder pressures Pm1, Pm2 are detected as values corresponding to the braking force to the brake pedal 12 applied by the vehicle operator.

The brake pedal 12 is provided with a stroke sensor 70 that detects a depression stroke St of the brake pedal 12 as a degree of displacement resulting from the braking operation of the vehicle operator. A pressure sensor 72 that detects the pressure in the hydraulic pressure supply pipe 32 as an accumulator pressure Pa is provided in the hydraulic pressure supply pipe 32 on the discharge side of the oil pump 36.

Pressure sensors 74FL and 74RL that detect pressures in the corresponding brake oil supply pipes as pressures Pfl, Prl in the corresponding wheel cylinders 22FL, 22RL are provided in the brake oil pressure supply pipes 18 and 20 between the electromagnetic switching valve 24F and the wheel cylinder 22FL, and the electromagnetic switching valve 24R and the wheel cylinder 22RL, respectively. In addition, pressure sensors 74FR and 74RR for detecting pressures in the corresponding hydraulic pressure control pipes 44, 48 as pressures Pfr, Prr in the corresponding wheel cylinders 22FR, 22RR are respectively provided in the hydraulic pressure control pipes 44 and 48 between the electromagnetic switching valve 50FR, 50RR and the wheel cylinder 22FR, 22RR.

The electromagnetic switching valves 24F, 24R, electromagnetic switching valve 26, electric motor 34, electromagnetic switching valves 50FL, 50FR, 50RL, 50RR, electromagnetic switching valves 60FL, 60FR, 60RL, 60RR, and electromagnetic switching valves 64F, 64R are controlled by an electronic control unit (ECU) 76 as described below in detail. The ECU 76 includes a microcomputer 78 and a driving circuit 80.

A driving current is applied from a battery (not shown in FIG. 1A) to each electromagnetic switching valve and the electric motor 34 through the driving circuit 80. Particularly at a non-control state in which no driving current is applied to each electromagnetic switching valve and the electric motor 34, the electromagnetic switching valves 24F, 24R and 64F, 64R are retained in an open state. Meanwhile, the electromagnetic switching valve 26, 50FL, 50FR, 50RL, 50RR and 60FL, 60FR, 60RL, 60RR are retained in a closed state i.e., non-control mode.

Although not shown in detail in FIG. 1B, the microcomputer 78 may have a common structure including, for example, a central processing unit (CPU), a read only memory (ROM), a random access memory (RAM), and an input/output (I/O) port, which are connected to each other via a bidirectional common bus.

The I/O port of the microcomputer 78 receives signals from the pressure sensors 66 and 68 indicating a first master cylinder pressure Pm1 and a second master cylinder pressure Pm2, respectively, a signal from the stroke sensor 70 indicating a depression stroke St of the brake pedal 12, a signal from the pressure sensor 72 indicating an accumulator pressure Pa, and signals from the pressure sensors 74FL to 74RR indicating a pressure Pi (i=fl, fr, rl, rr) in the wheel cylinders 22FL to 22RR, respectively.

Figure 2:
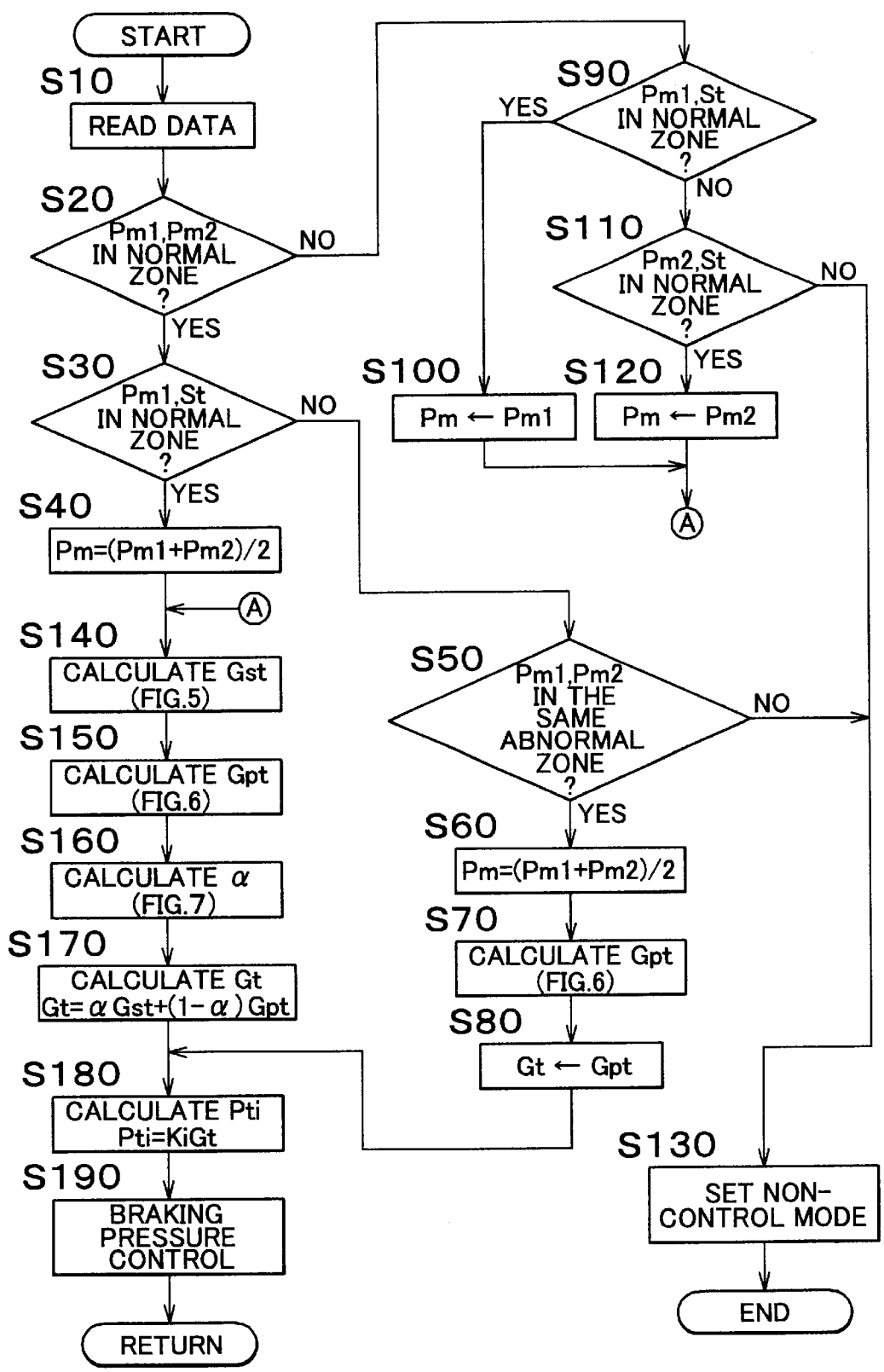
FIG. 2 is a flowchart illustrating a brake force control routine according to one exemplary embodiment of this invention.

The ROM of the microcomputer 78 pre-stores a braking force control scheme illustrated in FIG. 2 as described below. The CPU estimates the braking amount required by the vehicle operator on the basis of the master cylinder pressures Pm1, Pm2 detected by the pressure sensors 66, 68 and the depression stroke St detected by the stroke sensor 70. Then the CPU calculates a final target deceleration Gt of the vehicle on the basis of the estimated required braking amount, and a target braking pressure Pti (i=fl, fr, rl, rr) of each wheel on the basis of the final target deceleration Gt so as to control the wheel cylinder pressure of each wheel to the target braking pressure Pti.

The microcomputer 78 determines if there is an abnormality in the pressure sensors 66, 68 and the stroke sensor 70, for example, disconnection or shortcircuit, that prevents those sensors from detecting the braking amount operated by the operator. If it is determined that there is no abnormality in at least two of the pressure sensors 66, 68 and the stroke sensor 70, the electromagnetic switching valves 24F and 24R are closed, and the oil pump 36 is activated in case of necessity. Then the braking device is brought into the control mode so as to be controlled by the electromagnetic switching valves 50FL to 50RR, and 60FL to 60RR. If it is determined that there is abnormality in at least two sensors, the braking device is brought into the non-control mode.

The microcomputer 78 determines if there is inconsistency between the master cylinder pressures Pm1, Pm2 detected by the pressure sensors 66, 68 and the depression stroke St detected by the stroke sensor 70 to determine any abnormality in the braking device. If there is abnormality in the braking device, the braking amount required by the vehicle operator is estimated on the basis of the master cylinder pressures Pm1, Pm2, and the depression stroke St in which there is consistency thereamong.

Figure 3:
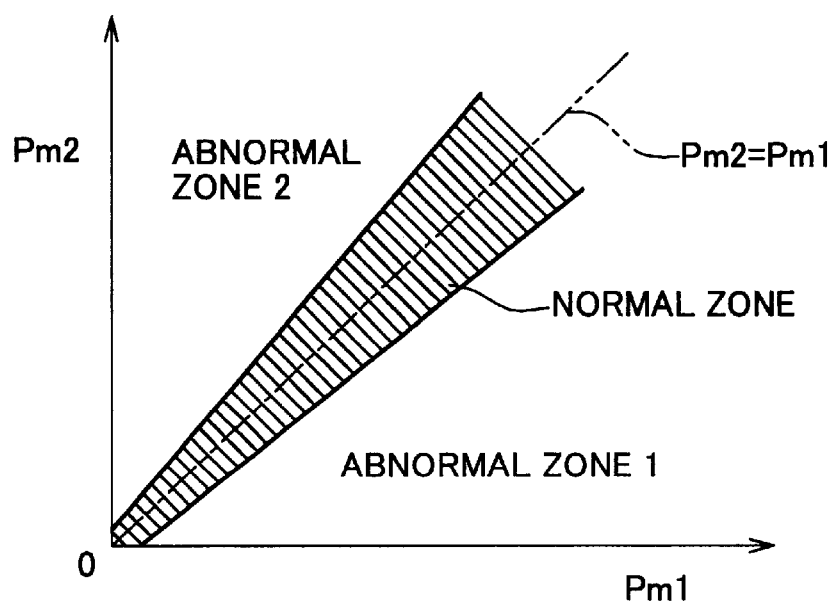
FIG. 3 is a graph showing a relationship between a first master cylinder pressure and a second master cylinder pressure.

When the pressure sensors 66, 68 have no abnormality, such as disconnection, short circuit, and abnormal gain, and the braking device has no abnormality, the detection value Pm1 of the first master cylinder pressure and the detection value Pm2 of the second master cylinder pressure are within a normal zone defined by hatching lines as shown in FIG. 3. if, therefore, those detection values are within the normal zone, it is determined that there is consistency between those values. On the other hand, if those detection values are not within the normal zone, it is determined that there is inconsistency between those values.

Figure 4:
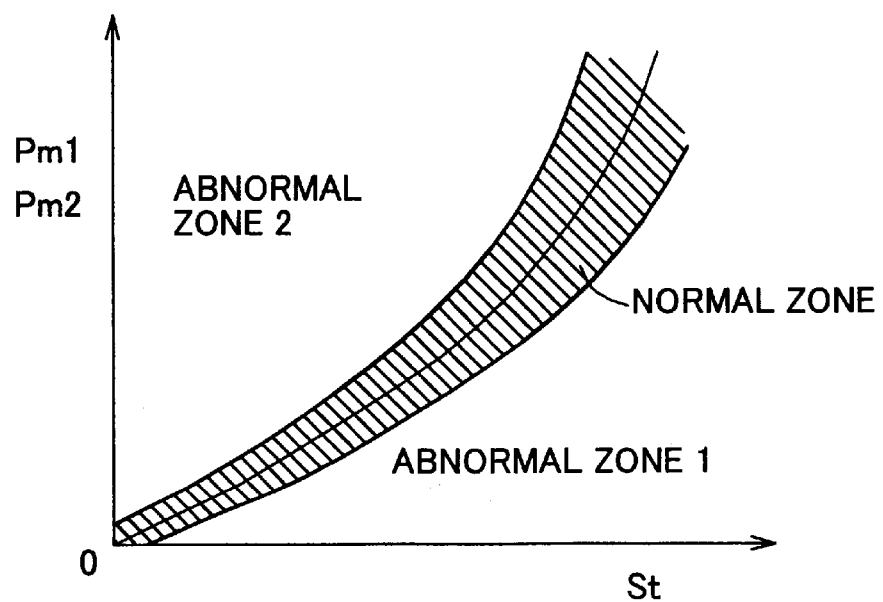
FIG. 4 is a graph showing a relationship between a depression stroke and master cylinder pressures.

When the pressure sensors 66, 68 and the stroke sensor 70 have no abnormality, such as disconnection, short circuit, and abnormal gain, and the braking device has no abnormality, the detection value Pm1 of the first master cylinder pressure and the detection value Pm2 of the second master cylinder pressure are within a normal zone defined by hatching lines as shown in FIG. 4. If, therefore, those detection values are within the normal zone, it is determined whether there is consistency between those values. On the other hand, if those detection values are not within the normal zone, it is determined that there is inconsistency in the detection values of Pm1, Pm2 with respect to the detection value St of the depression stroke.

When there is consistency between the Pm1 and the Pm2, 5 cases may be assumed as shown in Table 1. Since it is highly unlikely that cases A2 and A3 will occur, these cases are not discussed. In case A1 in which all the detection values are normal, the braking amount required by the vehicle operator is estimated on the basis of an average value of the Pm1 and Pm2, and the St.

In case A4, in which the detection value St of the depression stroke has an abnormality, the braking amount required by the vehicle operator is estimated on the basis of the average value of the Pm1 and Pm2. In case A5, in which no detection values have reliability, the braking device is brought into a non-control mode in which each pressure in the respective wheel cylinders 22FL to 22RR is directly controlled by the master cylinder 14.

TABLE 1

| Case | Condition | Determination | Estimation of braking amount |
|------|-----------|---------------|------------------------------|
| A1 | Consistent between Pm1 and St<br>Consistent between Pm2 and St | All normal | (Pm1 + Pm2)/2, St |
| A2 | Consistent between Pm1 and St<br>Inconsistent between Pm2 and St | (Unable to determine) | (Unable to estimate) |
| A3 | Inconsistent between Pm1 and St<br>Consistent between Pm2 and St | (Unable to determine) | (Unable to estimate) |
| A4 | Inconsistent between Pm1 and St<br>Inconsistent between Pm2 and St<br>(same abnormal zone) | St in an abnormal state | (Pm1 + Pm2)/2 |
| A5 | Inconsistent between Pm1 and St<br>Inconsistent between Pm2 and St<br>(different abnormal zone) | Unclear | Non-control mode |

When there is inconsistency between the St and the Pm1, Pm2, 4 cases may be assumed as shown in Table 2 below. Since it is highly unlikely that case B1 will occur, it is not discussed.

In case B2 in which it is determined that the Pm2 has an abnormality, the braking amount required by the vehicle operator is estimated on the basis of the Pm1 and St. In case B3 in which it is determined that the Pm1 has an abnormality, the braking amount required by the vehicle operator is estimated on the basis of the Pm2 and St. In case B4 in which no detection values are reliable, the braking device is brought into a non-control mode.

TABLE 2

| Case | Condition | Determination | Estimation of braking amount |
|------|-----------|---------------|------------------------------|
| B1 | Consistent between Pm1 and St<br>Consistent between Pm2 and St | (unable to determine) | (unable to determine) |
| B2 | Consistent between Pm1 and St<br>Inconsistent between Pm2 and St | Abnormality in Pm2 | Pm1, St |
| B3 | Inconsistent between Pm1 and St<br>Consistent between Pm2 and St | Abnormality in Pm1 | Pm2, St |
| B4 | Inconsistent between Pm1 and St<br>Inconsistent between Pm2 and St | Unclear | Non-control mode |

Moreover, the ECU 76 is operable to drive the electric motor 34 as necessary on the basis of the accumulator pressure Pa detected by the pressure sensor 72 to actuate the oil pump 36 such that the pressure in the accumulator is retained at a value between a preset lower limit and a preset upper limit.

Hereinafter, braking force control of the illustrated embodiment will be described with reference to the flowchart shown in FIG. 2. In this embodiment, the control routine illustrated in the flowchart of FIG. 2 starts in response to turning on an ignition switch (not shown), and is repeatedly executed at a predetermined time interval.

First, in step S10, signals indicating the first master cylinder pressure Pm1 and the second master cylinder pressure Pm2 detected by the pressure sensors 66 and 68 are read.

Although not shown in the figure, prior to step S10, the electromagnetic switching valve 24F and the like are set to a control position, and it is initially determined whether the sensors, including the pressure sensor 66, have disconnection or short-circuit. If at least two of the pressure sensors 66, 68 and the stroke sensor 70 have disconnection or short-circuit, the control routine illustrated in FIG. 2 starts over while keeping the braking device in a non-control mode. If there is no such abnormality, the braking device is brought into a control mode, and the process proceeds to step S20.

In step S20, it is determined whether the detection values of the first and the second master cylinder pressures Pm1 and Pm2 detected by the pressure sensors 66 and 68 are within the normal zone shown in FIG. 3. That is, it is determined whether there is a consistency between the Pm1 and Pm2. If NO is obtained in step S20, the process proceeds to step S90. If YES is obtained in step S20, the process proceeds to step S30.

In step S30, it is determined whether the detection value Pm1 and the detection value St of the depression stroke of the brake pedal detected by the stroke sensor 70 are within the normal zone shown in FIG. 4. That is, it is determined whether there is not inconsistency between the Pm1 and St. If YES is obtained in step S30, a master cylinder pressure Pm for controlling the braking force is set to an average value of the detection values Pm1 and Pm2 in step S40, and the process then proceeds to step S140. If NO is obtained in step S30, the process proceeds to step S50.

In step S50, it is determined whether the Pm1 and the Pm2 are within the same abnormal zone relative to the normal zone shown in FIG. 4. That is, it is determined whether those detection values have the same abnormal relations with the detection value St of the depression stroke of the brake pedal. If NO is obtained in step S50, the process proceeds to step S130. If YES is obtained in step S50, the process proceeds to step S60 in which the master cylinder pressure Pm for controlling the braking force is set to the average value of the detection values Pm1 and Pm2.

Figure 6:
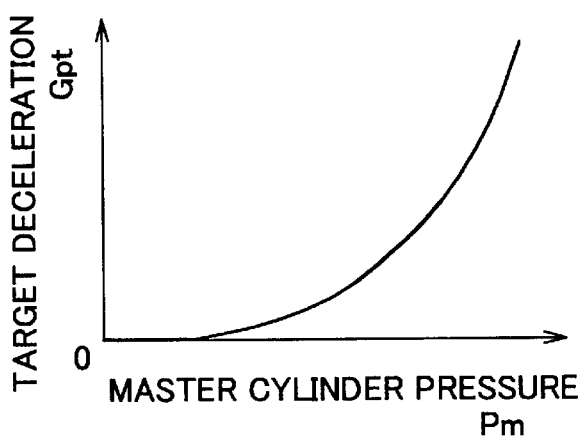
FIG. 6 is a graph showing a relationship between a master cylinder pressure and a target deceleration.

In step S70, a target deceleration Gpt is calculated using the master cylinder pressure Pm for controlling the braking force referring to a map shown in FIG. 6. In step S80, a final target deceleration Gt is set to the target deceleration Gpt.

Meanwhile in step S90, like in step S30, it is determined whether the detection value of the first master cylinder pressure, Pm1, detected by the pressure sensor 66 and the detection value of the depression stroke of the brake pedal, St, detected by the stroke sensor 70 are within the normal zone shown in FIG. 4. That is, it is determined whether there is consistency between those detection values. If YES is obtained in step S90, the master cylinder pressure Pm for controlling the braking force is set to the detection value Pm1 in step S100, and the process proceeds to step S140. If NO is obtained in step S90, the process proceeds to step S110.

In step S110, it is determined whether the detection value of the second master cylinder pressure, Pm2, detected by the pressure sensor 68 and the detection value of the depression stroke of the brake pedal, St, detected by the stroke sensor 70 are within the normal zone shown in FIG. 4. That is, it is determined whether there is consistency between those detection values. If YES is obtained in step S110, the master cylinder pressure Pm for controlling the braking force is set to the detection value Pm2 in step S120, and the process proceeds to step S140. If NO is obtained in step S110, the process proceeds to step S130.

NO obtained in step S110 indicates that there is no combination of detection values of the pressure sensors 66, 68, and the stroke sensor 70 in which there is consistency, resulting in no reliable data for the braking pressure control. Then in step S130, the electromagnetic switching valve 24F and the like are brought into a non-control position such that the pressure of each wheel cylinder is controlled by the pressure in the master cylinder.

Figure 5:
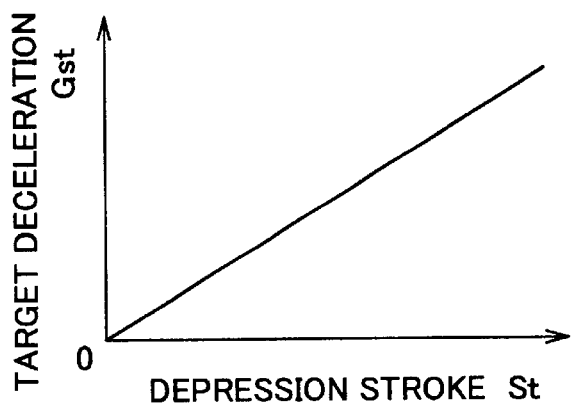
FIG. 5 is a graph showing a relationship between a depression stroke and a target deceleration Gst.

In step S140, a target deceleration Gst is calculated using the depression stroke St detected by the stroke sensor 70 referring to a map shown in FIG. 5. In step S150, a target deceleration Gpt is calculated using the master cylinder pressure Pm for controlling the braking force referring to a map shown in FIG. 6.

Figure 7:
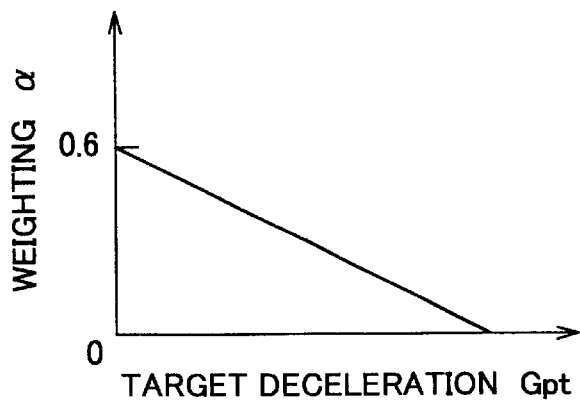
FIG. 7 is a graph showing a relationship between a target deceleration and a weighting to the target deceleration.

In step S160, a weight α ($0 \leq \alpha \leq 0.6$) to the target deceleration Gst is calculated using the target deceleration Gpt referring to a map shown in FIG. 7. In step S170, a final target deceleration Gt is calculated as a weighted sum of the target decelerations Gpt and Gst using an expression (1) below. Although the weight α is set in the range of $0 < \alpha < 0.6$, in the illustrated embodiment, the maximum value of the weight α is not limited to 0.6, and may be any value between 0 and 1 inclusive.

$$Gt = \alpha Gst + (1-\alpha)Gpt \qquad (1)$$

In step S180, a target wheel cylinder pressure Pti (i=fl, fr, rl, rr) of each wheel is calculated using expression (2).

$$Pti = KiGt \qquad (2)$$

where Ki (i=fl, fr, rl, rr) is a coefficient positive constant) of the target wheel cylinder pressure of each wheel for the final target deceleration Gt. In step S190, the wheel cylinder pressure of each wheel is controlled to the target braking pressure Pti.

In the embodiment structured as described above, when the pressure sensors 66, 68 and the stroke sensor 70 are in a normal condition and the braking device is also in a normal condition, "YES" is obtained in step S20 and S30. Therefore, in step S40, S140 to S190, the braking force applied to each wheel is controlled based on the average value Pm of the detection values of the first and the second master cylinder pressures Pm1 and Pm2, and the detection value St of the depression stroke of the brake pedal.

Meanwhile, when the pressure sensors 66, 68 and the stroke sensor 70 are in a normal condition but the electromagnetic switching valve 24F or 24R is not sufficiently placed in an open state, a high-pressure hydraulic fluid in the accumulator 38 flows into the master cylinder 14 through the electromagnetic switching valve 24F or 24R. In this case, the brake pedal 12 is forced back against the depression force of the vehicle operator. As a result, the detection value of the depression stroke St is reduced.

In the above case, the detection values of the master cylinder pressures, Pm1 and Pm2, and the detection value of the depression stroke, St, are within the abnormal zone 2 as shown in FIG. 4. In this situation, YES is obtained in step S20 of the control routine. Then NO is obtained in step S30 and YES is obtained in step S50. As a result, in step S60 to S80 and step S180 and S190, the braking force of each wheel is controlled based on the detection values of Pm1 and Pm2 consistent with each other without using the detection value St that fails to reflect the braking amount required by the vehicle operator. The same control as above is also executed when the stroke sensor 70 has an abnormal gain.

When the stroke sensor 70 and the braking device are in a normal condition but the pressure sensor 66 or 68 has the abnormal gain, the detection value of the master cylinder pressure Pm1 or Pm2 is within the abnormal zone 1 or 2 as shown in FIG. 3. In this case, NO is obtained in step S20.

Particularly when the first pressure sensor 66 has the abnormal gain, NO is obtained in step S90 and YES is obtained in step S110. In step S120, the master cylinder pressure Pm for controlling the braking force is set to the detection value Pm2. Then in step S140 to S190, the braking force applied to each wheel is controlled based on the detection values except the first master cylinder pressure Pm1 that fails to correctly reflect the braking amount required by the vehicle operator. That is, the braking force is controlled based on the detection value of the second master cylinder pressure Pm2 and the detection value of the depression stroke of the brake pedal St, in which there is consistency with each other.

When the second pressure sensor 68 has the abnormal gain, YES is obtained in step S90. In step S100, the master cylinder pressure Pm for controlling the braking force is then set to the detection value Pm1. Then in step S140 to S190, the braking force applied to each wheel is controlled based on the detection values except the detection value of the second master cylinder pressure Pm2 that fails to correctly reflect the braking amount required by the vehicle operator. That is, the braking force is controlled based on the detection value of the first master cylinder pressure Pm1 and the detection value of the depression stroke of the brake pedal ST, in which there is consistency with each other.

When the abnormal gain occurs in at least two of the pressure sensors 66, 68 and the stroke sensor 70, two cases may be assumed as described below. In one case, the detection values Pra1 and Pm2 are within the normal zone as shown in FIG. 3, but the Pm1 and Pm2 are within different abnormal zones that deviate from a normal zone for a relation between detection values of the master cylinder pressures Pm1, Pm2 and depression strokes St as shown in FIG. 4. In another case, the detection values Pm1, Pm2 are within the abnormal zone shown in FIG. 3, and also within the abnormal zone shown in FIG. 4.

In the former case, YES is obtained in step S20, and NO is obtained in step S30. Then in step S50, NO is obtained. In the latter case, NO is obtained in the respective step S20, S90, S110, and then in step S130, the braking device is returned to the non-control mode. This makes it possible to prevent execution of the braking force control that is not required by the operator of the vehicle.

Thus, in the aforementioned embodiment, even if inconsistency occurs between a set of values consisting of the master cylinder pressures Pm1, Pm2, and the depression stroke St owing to insufficient open state of the electromagnetic switching valves 24, 24R or the abnormal gain in the pressure sensors 66, 68, and the stroke sensor 70, the final target deceleration Gt can be obtained on the basis of the set of values consisting of the Pm1, Pm2, St in which there is consistency. This ensure that calculating the final target deceleration Gt of the vehicle occurs in accordance with the braking amount required by the vehicle operator. As a result, the braking force applied to each wheel can be controlled in accordance with the braking amount required by the operator of the vehicle.

Particularly in the aforementioned embodiment, a combination of two pressure sensors and a single stroke sensor is employed. The number of sensors in this embodiment is smaller compared with combination of two pressure sensors and two stroke sensors, or at least three pressure sensors and at least two stroke sensors. This configuration can reduce costs as well as simplify the control scheme that controls braking. This configuration also simplifies braking force control on the basis of the determination as to whether there is any abnormality.

In this embodiment, in the case where the final target deceleration Gt is calculated on the basis of both the detection values of the master cylinder pressures and the detection value of the depression stroke, the target deceleration Gpt on the basis of the detection values of the master cylinder pressures and the target deceleration Gst on the basis of the detection value of the depression stroke are calculated. Then a weight a to the target deceleration Gst is calculated so that the weight a increases as the target deceleration Gpt decreases. The final target deceleration Gt is then calculated by the equation below:

$$Gt=\alpha Gst+(1-\alpha)Gpt \tag{1}$$

Accordingly in a region where the braking amount required by the operator is small, the detection value of the depression stroke that correctly reflects the required braking amount is considered as more important compared with the detection values of the master cylinder pressures. Meanwhile, in a region where the braking amount required by the vehicle operator is large, the detection values of the master cylinder pressures that correctly reflect the required braking amount are considered as more important compared with the detection value of the depression stroke. This makes it possible to control the braking force in accordance with the braking amount required by the operator of the vehicle more correctly compared with the case without using the weighting.

The invention has been described in detail in terms of the specific embodiment. However, it would be apparent to those skilled in the art that the invention is not limited to the above embodiment and various embodiments are possible without departing from the scope of the invention.

For example, in the aforementioned embodiment, case A4 (shown in Table 1) is discriminated from case A5 (shown in Table 1) in step S50. In the control scheme, however, this step S50 may be omitted by directly proceeding to step S60 when NO is obtained in step S30. This omission may be particularly applicable when it is determined whether the Pm1 and Pm2 are equivalent in step S20.

In the aforementioned embodiment, cases A2 and A3 in Table 1, and the case B1 in Table 2 are not discussed. However, the control scheme may proceed to step S130 when those cases occur, such that the braking device is returned to the non-control mode.

In the aforementioned embodiment, the pressure sensors for detecting the pressure in the respective master cylinders serve as the operation force detector that detects the operation force to a braking member applied by the operator. Alternatively, a depression force sensor that detects the depression force to the brake pedal applied by the operator may be employed as the operation force detector.

In the aforementioned embodiment, the pressure in the wheel cylinders of the respective wheels is controlled in the control mode by the electromagnetic switching valves 50FL to 50RR serving as compression control valves corresponding to the respective wheels and the electromagnetic switching valves 60FL to 60RR serving as decompression control valves corresponding to the respective wheels. However, the braking controller may have a structure in which the accumulator 38 is omitted and the pressure within the wheel cylinder to which the highest braking pressure is applied may be controlled by an exhaust pressure of the pump 72 such that pressures within the rest of the wheel cylinders are controlled by a compression/decompression control valve.

In the aforementioned embodiment, an alarm for alarming the operator of the vehicle when the braking force cannot be optimally applied is not employed. However, if a certain abnormality such as disconnection, occurs in the pressure sensors 66, 68 and the stroke sensor 70 or the abnormal gain occurs, the alarm is generated by the alarming device such as an alarm lamp.

In the illustrated embodiments, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A brake control system for a vehicle, comprising:
   a valve that cuts off a passage between a master cylinder and a wheel cylinder;
   a fluid supply source that supplies fluid to the passage between the valve and the wheel cylinder;
   at least two first detectors that detect a force applied to a braking member;
   at least one second detector that detects a displacement of the braking member; and
   a controller that controls hydraulic pressure within the wheel cylinder based on values detected by the first and the second detectors,
   wherein a number of the first detectors is larger than a number of the at least one second detector, and the hydraulic pressure within the wheel cylinder is controlled based on less than all of the detected values when there is inconsistency among the values detected by the first and second detectors.

2. The brake control system according to claim 1, wherein the controller determines whether pairs of the detected values have consistency by determining whether a relationship between each pair of the detected values is within a predetermined zone.

3. The brake control system according to claim 1, wherein the at least two first detectors detect a pressure within the master cylinder.

4. The brake control system according to claim 1, wherein the at least two first detectors detect a depression force applied to the braking member by an operator of the vehicle.

5. The brake control system according to claim 1, wherein the at least one second detector detects a stroke of the braking member.

6. The brake control system according to claim 1, wherein the at least two first detectors comprise two operation force detectors and the at least one second detector comprises one displacement detector; and
   the controller controls the hydraulic pressure within the wheel cylinder based on values detected by the two operation force detectors when there is consistency between the values detected by the two operation force detectors, and there is inconsistency between the values detected by the two operation force detectors and a value detected by the one displacement detector.

7. The brake control system according to claim 6, wherein the controller controls the hydraulic pressure within the wheel cylinder based on an average value of the values detected by the two operation force detectors when there is consistency between the values detected by the two operation force detectors, and there is inconsistency between the values detected by the two operation force detectors and the value detected by the one displacement detector.

8. The brake control system according to claim 6, wherein:
   the controller determines whether each pair of the detected values has consistency by determining whether a relationship between the each pair of the detected values is within a predetermined zone; and the controller controls the hydraulic pressure within the wheel cylinder based on the values detected by the two operation force detectors when a relationship between the values detected by the two operation force detectors is within the predetermined zone, and relationships between the values detected by the two operation force detectors and the value detected by the one displacement detector are within an abnormal zone that deviates from the predetermined zone with respect to the relationship between the values detected by the two operation force detectors and the one displacement detector.

9. The brake control system according to claim 6, wherein:

the controller determines whether each pair of the detected values has consistency by determining whether a relationship between the each pair of the detected values is within a predetermined zone; and the controller places the valve in an open state such that the hydraulic pressure within the wheel cylinder is directly controlled by the hydraulic pressure within the master cylinder when a relationship between the values detected by the two operation force detectors is within the predetermined zone, and relationships between the values detected by the two operation force detectors and the value detected by the one displacement detector are within different abnormal zones that deviate from the predetermined zone with respect to the relationship between the values detected by the two operation force detectors and the one displacement detector.

10. The brake control system according to claim 1, wherein the at least two first detectors comprise two operation force detectors and the at least one second detector comprises one displacement detector; and the controller controls the hydraulic pressure within the wheel cylinder based on one of the values detected by the two operation force detectors and the value detected by the one displacement detector when there is inconsistency between values detected by the two operation force detectors, and there is consistency between one of the values detected by the two operation force detectors and a value detected by the one displacement detector.

11. The brake control system according to claim 10, wherein:

the controller determines whether each pair of the detected values has consistency by determining whether a relationship between the each pair of the detected values is within a predetermined zone; and the controller places the valve in an open state such that the hydraulic pressure within the wheel cylinder is directly controlled by the hydraulic pressure within the master cylinder when a relationship between the values detected by the two operation force detectors is not within the predetermined zone, and relationships between the values detected by the two operation force detectors and the value detected by the one displacement detector are within different abnormal zones that deviate from the predetermined zone with respect to the relationship between the values detected by the two operation force detectors and the one displacement detector.

12. The brake control system according to claim 6, wherein when there is consistency among the values detected by the two operation force detectors and the one displacement detector, the controller controls the hydraulic pressure within the wheel cylinder based on an average value of the two detection values of the two operation force detectors, and the detection value of the one displacement detector.

13. The brake control system according to claim 7, wherein when there is consistency among the values detected by the two operation force detectors and the one displacement detector, the controller controls the hydraulic pressure within the wheel cylinder based on an average value of the two detection values of the two operation force detectors, and the detection value of the one displacement detector.

14. The brake control system according to claim 8, wherein when there is consistency among the values detected by the two operation force detectors and the one displacement detector, the controller controls the hydraulic pressure within the wheel cylinder based on an average value of the two detection values of the two operation force detectors, and the detection value of the one displacement detector.

15. The brake control system according to claim 6, wherein the controller determines that there is consistency in a relationship between values detected by the two operation force detectors when the two detection values are substantially the same.

16. The brake control system according to claim 9, wherein the controller determines that there is consistency in a relationship between values detected by the two operation force detectors when the two detection values are substantially the same.

17. The brake control system according to claim 10, wherein the controller determines that there is consistency in a relationship between values detected by the two operation force detectors when the two detection values are substantially the same.

18. The brake control system according to claim 1, wherein a pressure within a wheel cylinder to which a highest braking pressure is applied is controlled by an exhaust pressure of a pump of the vehicle, and the pressures within the remaining wheel cylinders are controlled by control valves so as to be increased and decreased.

19. The brake control system according to claim 1, wherein an alarm device alarms the operator of the vehicle of an inconsistency within a set of values detected by at least two first detectors and at least one second detector.

20. A method for operating a brake control system for a vehicle, comprising:

cutting off a passage between a master cylinder and a wheel cylinder;

supplying fluid to the passage between a valve for cutting off the passage and the wheel cylinder;

detecting a force applied to a braking member;

detecting a displacement of the braking member; and controlling hydraulic pressure within the wheel cylinder based on the detected values, wherein a number of detectors detecting the force applied to the braking member is larger than a number of detectors detecting the displacement of the braking member, and the hydraulic pressure within the wheel cylinder is controlled based on less than all of the detected values when there is inconsistency among the detected values.

21. The method for operating a brake control system for a vehicle according to claim 20, further comprising determining whether pairs of the detected values have consistency by determining whether a relationship between each pair of the detected values is within a predetermined zone.

22. The method for operating a brake control system for a vehicle according to claim 20, wherein the detecting the force applied to the braking member is based on a pressure within the master cylinder.

23. The method for operating a brake control system for a vehicle according to claim 20, further comprising detecting a depression force applied to the braking member by an operator of the vehicle.

24. The method for operating a brake control system for a vehicle according to claim 20, further comprising detecting a stroke of the braking member.

25. The method for operating a brake control system for a vehicle according to claim 20, further comprising the detectors having two operation force detectors and one displacement detector; and controlling the hydraulic pressure within the wheel cylinder based on values detected by the two operation force detectors when there is consistency between the values detected by the two operation force detectors, and there is inconsistency between the values detected by the two operation force detectors and a value detected by the one displacement detector.

26. The method for operating a brake control system for a vehicle according to claim 20, further comprising the detectors having two operation force detectors and one displacement detector; and controlling the hydraulic pressure within the wheel cylinder based on one of the values detected by the two operation force detectors and the value detected by the one displacement detector when there is inconsistency between values detected by the two operation force detectors, and there is consistency between one of the values detected by the two operation force detectors and a value detected by the one displacement detector.

27. The method for operating a brake control system for a vehicle according to claim 20, further comprising controlling pressure within a wheel cylinder to which a highest braking pressure is applied by an exhaust pressure of a pump of the vehicle, and controlling the pressures within the remaining wheel cylinders by control valves so as to be increased and decreased.

28. The method for operating a brake control system for a vehicle according to claim 20, further comprising alarming the operator of the vehicle of an inconsistency within a set of detected values.

* * * * *